US008648506B2

(12) United States Patent
Bradfield

(10) Patent No.: US 8,648,506 B2
(45) Date of Patent: Feb. 11, 2014

(54) ROTOR LAMINATION COOLING SYSTEM AND METHOD

(75) Inventor: Michael D. Bradfield, Anderson, IN (US)

(73) Assignee: Remy Technologies, LLC, Pendleton, IN (US)

(*) Notice: Subject to any disclaimer, the term of this patent is extended or adjusted under 35 U.S.C. 154(b) by 234 days.

(21) Appl. No.: 12/942,881

(22) Filed: Nov. 9, 2010

(65) Prior Publication Data

US 2012/0112574 A1 May 10, 2012

(51) Int. Cl.
*H02K 9/00* (2006.01)

(52) U.S. Cl.
USPC ............ 310/61; 310/52; 310/54; 310/59

(58) Field of Classification Search
USPC ........ 310/52, 54, 59, 60 R, 61, 60 A, 216.004, 310/216.011, 216.052, 216.069, 216.097, 310/216.098
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,526,047 A * | 10/1950 | Ringland | 310/57 |
| 2,780,737 A * | 2/1957 | Labastie et al. | 310/54 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,301,386 A * | 11/1981 | Schweder et al. | 310/59 |
| 5,081,382 A | 1/1992 | Collings et al. | |
| 5,180,004 A | 1/1993 | Nguyen | |
| 5,207,121 A | 5/1993 | Blen | |
| 5,293,089 A | 3/1994 | Frister | |
| 5,372,213 A | 12/1994 | Hasebe et al. | |
| 5,445,504 A * | 8/1995 | Iwamura et al. | 417/368 |
| 5,519,269 A | 5/1996 | Lindberg | |
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |

(Continued)

FOREIGN PATENT DOCUMENTS

DE 4320559 A1 * 12/1994
JP 05-103445 A 4/1993

(Continued)

OTHER PUBLICATIONS

Machine Translation JP2009290979 (2009) and DE4320559 (1994).*

(Continued)

*Primary Examiner* — Tran Nguyen
*Assistant Examiner* — Jose Gonzalez Quinones
(74) *Attorney, Agent, or Firm* — Greenberg Traurig LLP

(57) ABSTRACT

Some embodiments of the invention provide an electric machine module including a rotor assembly. The rotor assembly can include a rotor hub, a first set of rotor laminations which can include a portion having a first inner radius, and a second set of rotor laminations which can include a portion having a second inner radius larger than the first inner radius. At least one circumferential flow channel defined by the first set of rotor laminations, the second set of rotor laminations, and the rotor hub can at least partially circumscribe the rotor hub.

17 Claims, 3 Drawing Sheets

(56) References Cited

U.S. PATENT DOCUMENTS

| | | |
|---|---|---|
| 6,011,332 A | 1/2000 | Umeda et al. |
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 | 12/2003 | Bostwick |
| 2004/0036367 A1 | 2/2004 | Denton et al. |
| 2004/0189110 A1 | 9/2004 | Ide et al. |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 | 5/2009 | Yim |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 05-292704 A | 11/1993 |
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2009290979 A * | 12/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report, Received Jul. 31, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

ROTOR LAMINATION COOLING SYSTEM AND METHOD

BACKGROUND

Electric machines, often contained within a housing, are generally comprised of a stator assembly and a rotor assembly. During operation of the electric machines, a considerable amount of heat energy can be generated by both the stator assembly and the rotor assembly, in addition to other components of the electric machines. Conventional cooling methods can include removing the generated heat energy by forced convection to a jacket filled with a coolant.

Some electric machines, including interior permanent magnet electric machines, can include magnets, which can generate heat energy but can be difficult to cool. If not properly cooled, the magnets can become largely demagnetized which can lead to a decrease in electric machine productivity and lifespan.

SUMMARY

Some embodiments of the invention provide an electric machine module including a rotor assembly. The rotor assembly can include a first set of rotor laminations which can include a portion having a first inner radius and a second set of rotor laminations which can include a portion having a second inner radius larger than the first inner radius. The rotor assembly can also include a rotor hub. The electric machine module can further include at least one flow channel at least partially circumscribing the rotor hub. The at least one flow channel can be defined between the first set of rotor laminations, the second set of rotor laminations, and the rotor hub.

Some embodiments of the invention provide an electric machine module including a rotor assembly. The rotor assembly can include a plurality of rotor laminations circumscribing a rotor hub. The plurality of rotor laminations can include a plurality of fins extending radially inward toward the rotor hub. The electric machine module can also include a plurality of circumferential flow channels defined between the fins and at least one axial pathway fluidly connecting at least some of the plurality of flow channels.

Some embodiments of the invention provide a method for cooling an electric machine module which can include providing an electric machine including a rotor assembly. The rotor assembly can include a plurality of rotor laminations and a rotor hub, and the plurality of rotor laminations can include a plurality of different inner diameters. The rotor hub can include at least one coolant aperture. The plurality of rotor laminations can be positioned relative to each other to form at least one circumferential flow channel substantially around a circumference of the rotor hub, where the at least one circumferential flow channel can be in fluid communication with the at least one coolant aperture. The method can also include providing a housing which can substantially circumscribe the electric machine and can at least partially define a machine cavity. The machine cavity can be in fluid communication with the at least one circumferential flow channel. The method can further include introducing a coolant through the at least one coolant aperture and circulating the coolant through the at least one circumferential flow channel to cool the electric machine.

DETAILED DESCRIPTION

Figure 1:
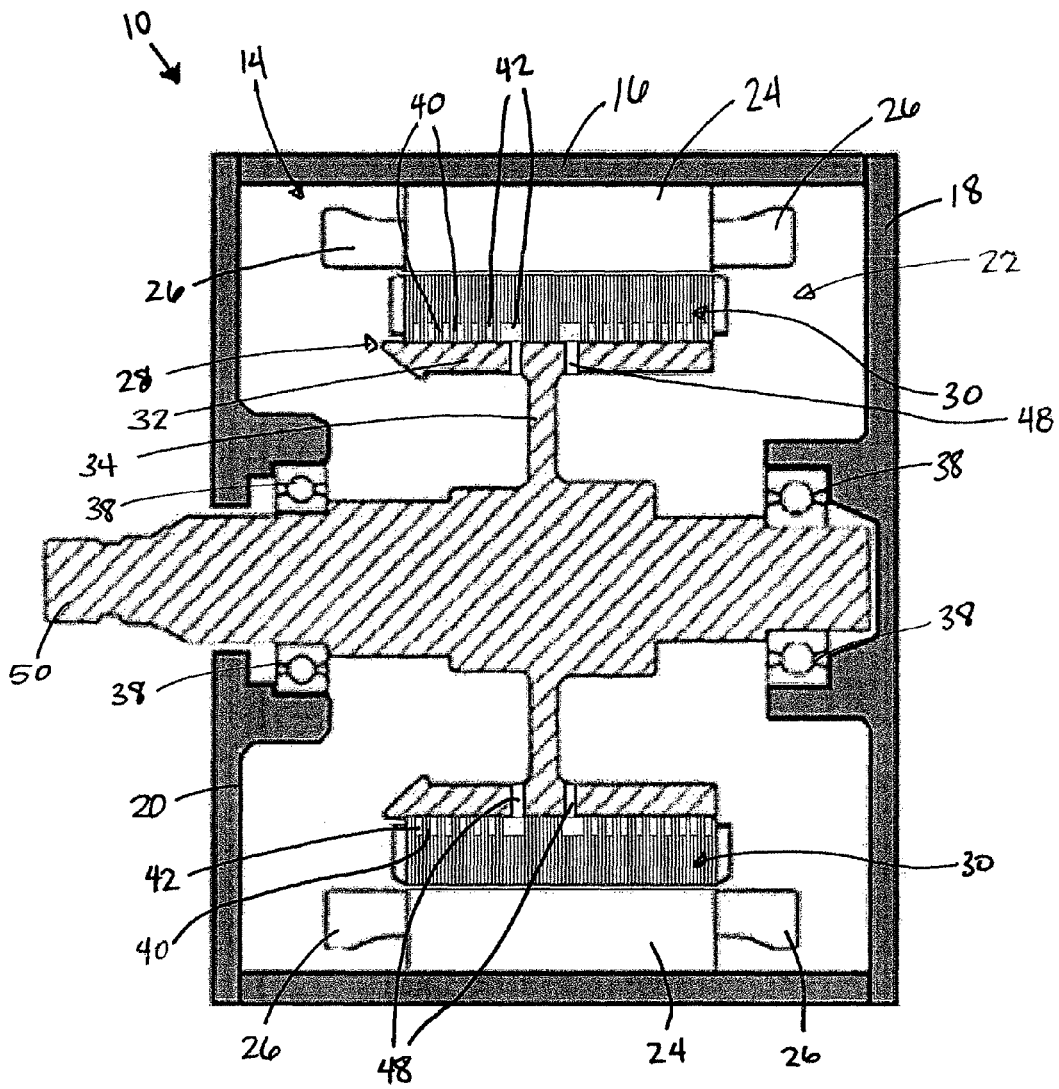
FIG. 1 is a front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a housing 12 which can substantially circumscribe an electric machine 14. The housing can comprise a sleeve member 16, a first end cap 18, and a second end cap 20. The electric machine 14 can be housed within a machine cavity 22 at least partially defined by the sleeve member 16 and the end caps 18, 20. For example, the sleeve member 16 and the end caps 18, 20 can be coupled via fasteners (not shown), or another suitable coupling manner, to enclose the electric machine 14 within the machine cavity 22. In some embodiments, the housing 12 can comprise a substantially enclosed, substantially cylindrical canister and a single end cap (not shown).

In some embodiments, the electric machine 14 can include a stator assembly 24 including stator end turns 26, a rotor assembly 28 comprising a plurality of rotor laminations 30, a rotor hub 32, a center support 34, and bearings 38. As shown in FIG. 1, the stator assembly 24 can, at least partially, circumscribe the rotor assembly 28. In some embodiments, the electric machine 14 can be an interior permanent magnet electric machine, in which case, the rotor assembly 28 can include at least one magnet 36 positioned in the rotor assembly 28. Also, the electric machine 14 can be, without limitation, an electric motor, such as an induction electric motor, a hybrid motor, an electric generator, or a vehicle alternator. In one embodiment, the electric machine 14 can be a High Voltage Hairpin (HVH) electric motor for use in a hybrid vehicle.

Components of the electric machine 14 such as, but not limited to, the stator assembly 24, the rotor assembly 28, and their respective components, can generate heat energy during the operation of the electric machine 14. These components can be cooled to enhance the performance and increase the lifespan of the electric machine 14.

Figure 2:
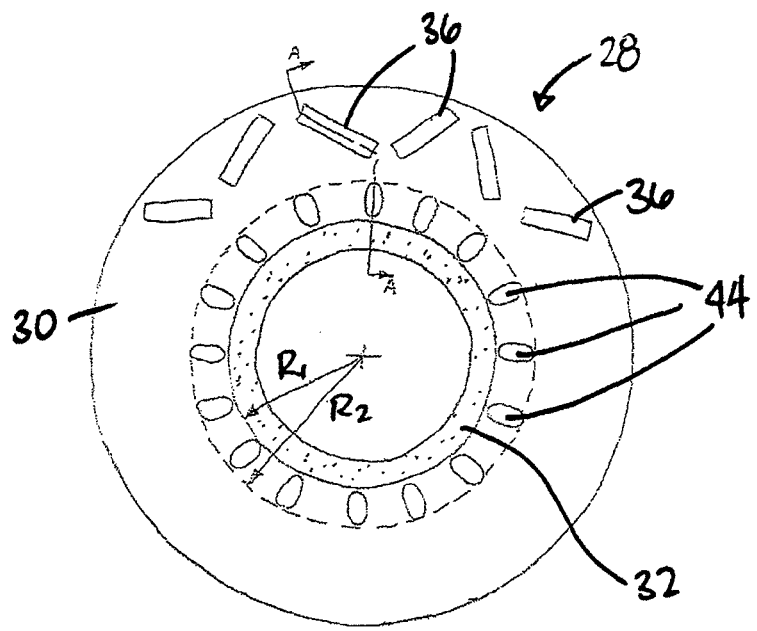
FIG. 2 is a side cross-sectional view of a rotor assembly for use with an electric machine module.
Figure 3:
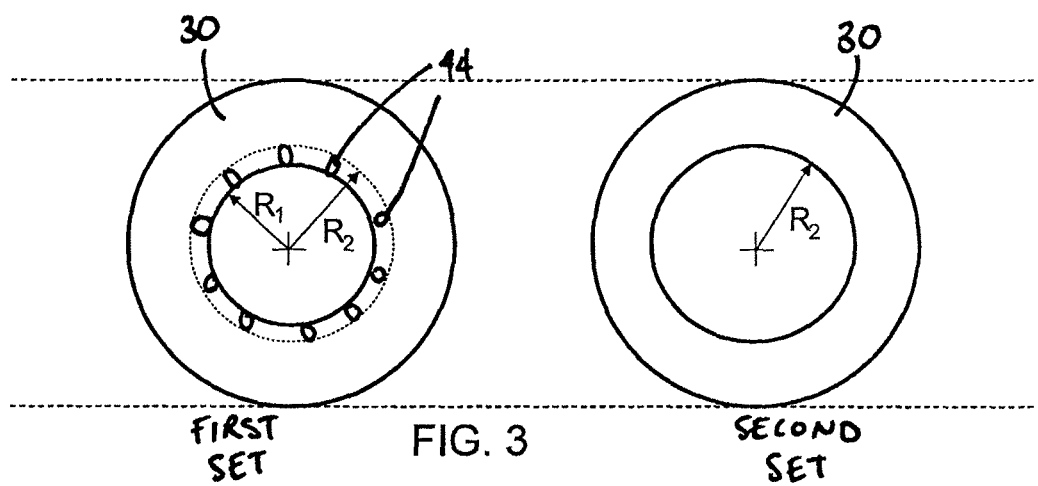
FIG. 3 is a side cross-sectional view of a first set of rotor laminations and a second set of rotor laminations for use with the electric machine of FIG. 2.
Figure 4:
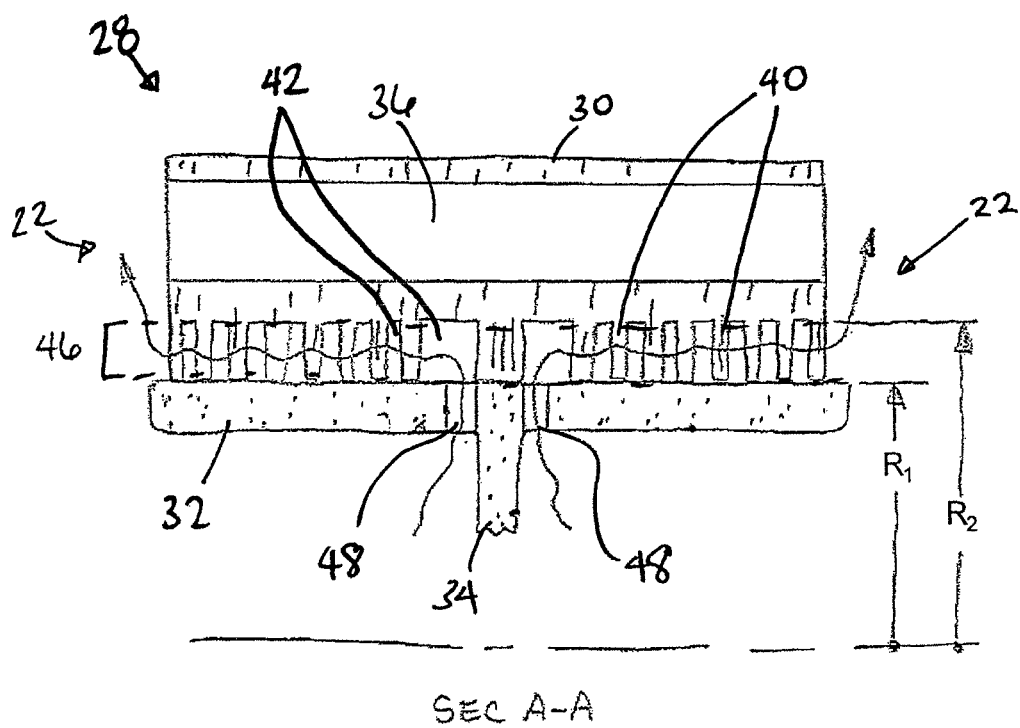
FIG. 4 is a front cross-sectional view of a rotor assembly along section A-A of the electric machine of FIG. 2.

In some embodiments of the invention, the plurality of rotor laminations 30 can create a finned internal surface which can at least partially circumscribe the rotor hub 32, as shown in FIGS. 1 and 4. More specifically, the plurality of rotor laminations 30 can have different inner diameters, as illustrated in FIGS. 2 and 3. When the plurality of rotor laminations 30 are assembled, they can create radially extending "fins" 40, which can at least partially circumscribe a portion of the rotor hub 32, as shown in FIGS. 1 and 4. In some embodiments, a first set of rotor laminations can include at least a portion having a first inner radius, R1, and a second set of rotor laminations can include at least a portion having a second inner radius, R2, larger than R1, thus forming the finned internal surface, as shown in FIGS. 1-4. The first set and the second set can be staggered one by one, two by two, one by two, etc. to form a desired fin profile. In one embodiment, an inner diameter of the first set of rotor laminations (i.e., twice the first inner radius R1) can be substantially equal to an outer diameter of the rotor hub 32. As a result, the rotor laminations 30 can be coupled to the rotor hub 32 by a press-fit between the outer diameter of the rotor hub 32 and the inner diameter of the first set of rotor laminations. The second set of rotor laminations 30 can be coupled to the first set of rotor laminations 30 by, for example, interlocking using a dimpled feature on each of the rotor laminations 30, welding along an outer circumference of the rotor laminations 30, or another suitable coupling manner since at least portions of the second set of rotor laminations 30 may not be directly press-fit against the outer diameter of the rotor hub 32 (e.g., due to the inner radius R2 being substantially larger than the inner radius R1).

In some embodiments, as shown in FIGS. 1 and 4, flow channels 42 can be defined between an outer surface of the rotor hub 32 and at least some portions of side surfaces of the first set and the second set of rotor laminations 30, such as outer sides the radially extending fins 40. More specifically, the flow channels 42 can be circumferential coolant channels substantially around at least a portion of a circumference of the rotor hub 32 (i.e., at least partially circumscribing the rotor hub 32). Additionally, multiple flow channels 42 can be located at different axial positions of the rotor assembly 28. In some embodiments, the flow channels 42 can be in fluid communication with the machine cavity 22, as described below.

As illustrated in FIGS. 2 and 3, in some embodiments, at least some of the first set of rotor laminations 30 can include one or more coolant openings 44. The coolant openings 44 can be oval, square, or another suitable shape and can be stamped through the first set of rotor laminations 30 prior to or after the rotor laminations 30 are coupled together. The coolant openings 44 can be located in different or similar locations on the first set of rotor laminations 30, and in some embodiments, the coolant openings 44 can be positioned so that when the plurality of rotor laminations 30 are coupled together, the coolant openings 44 can substantially align in order to define one or more axial coolant paths 46 (e.g., straight axial paths and/or skewed axial paths across the rotor assembly 28). In some embodiments, the coolant paths 46 can be in fluid communication with the machine cavity 22. For example, in one embodiment, the coolant paths 46 can extend from a substantially central location within the rotor assembly 28 axially outward toward the machine cavity 22, as shown in FIG. 4. In addition, the coolant paths 46 can be in fluid communication with the flow channels 42. For example, the coolant paths 46 can be straight, skewed, stepped, etc. in order to fluidly connect each of the flow channels 42. As a result, the coolant paths 46 can extend generally axially and/or generally circumferentially in order to fluidly connect the flow channels 42 with the machine cavity 22. In one embodiment, as shown in FIG. 3, the coolant openings 44 can extend from the inner radius R1 to the inner radius R2 along at least some of the first set of rotor laminations 30. More specifically, the first set of stator laminations with the coolant openings 44 can include portions with the first inner radius R1, as described above, and portions with the second inner radius R2.

In some embodiments, as shown in FIGS. 1 and 4, the rotor hub 32 can include one or more coolant apertures 48. The coolant apertures 48 can be located generally adjacent to the center support 34. In some embodiments, the coolant apertures 48 can be positioned along the rotor hub 32 at other locations along the axial length of the rotor hub 32. The plurality of coolant apertures 48 can fluidly connect the machine cavity 22 with the flow chambers 42 and the coolant paths 46. More specifically, the plurality of coolant apertures 48 can fluidly connect a radially inner portion of the machine cavity 22 (i.e., radially inner relative the rotor assembly 28) with the flow channels 42 and the coolant paths 46.

In some embodiments, a coolant can be dispersed from a point generally radially central with respect to the electric machine module 10. In some embodiments, a coolant source (not shown) can be located either internal or adjacent to a main output shaft 50 so that the coolant can flow either inside of or adjacent to the main output shaft 50. The coolant can flow toward the center of the electric machine module 10 where it then can be dispersed radially outward toward the plurality of coolant apertures 48 of the rotor hub 32. Due to centrifugal force from the operation of the electric machine 14, at least a portion of the coolant dispersed toward the coolant apertures 48 can flow through the coolant apertures 48 and enter the flow channels 42. Centrifugal force can pressurize the coolant through the coolant apertures 48 and the flow channels 42, which can further force the coolant to flow axially outward (i.e., through the coolant paths 46) toward the machine cavity 22, as shown in FIG. 4.

In some embodiments, as the coolant axially disperses through the flow chambers 42 and the coolant paths 46, it can provide uniform cooling to the rotor assembly 28 and, in turn, to the electric machine 14. The coolant can flow substantially near the magnets 36, including both axially central portions as well as peripheral portions of the magnets 36 along an axial length of the rotor assembly 28, in order to help cool the rotor assembly 28. In addition, as the coolant disperses it can flow both through the coolant path 46 and along faces and outer surfaces of the radially extending fins 40 to receive heat energy. The presence of the radially extending fins 40 can enhance cooling relative to the presence of conventional coolant channels (i.e., straight or skewed channels drilled through the laminations) due to the increased surface area over which coolant can flow and receive heat energy.

In some embodiments, the presence of the radially extending fins 40 can further enhance cooling because the coolant flow can be largely continuously sheered by the fins 40 during operation. More specifically, the rotor assembly 28 can rotate during operation of the electric machine 14 at a higher speed than the coolant within the flow channels 42. The coolant can then lag behind as it disperses through the flow channels 42 and the coolant paths 46, resulting in the coolant being sheered by the fins 40. By sheering the coolant flow, the coolant can be more thoroughly dispersed throughout the flow channels 42, including across the surfaces of the radially extending fins 40, which can enhance the cooling of the rotor assembly 28. Additionally, due to the general symmetry of the electric machine module 10, cooling can occur regardless of the direction of movement of the rotor assembly 28.

In some embodiments, once the coolant reaches the axial ends of the coolant paths 46, it can be substantially dispersed into the machine cavity 22. Further, in some embodiments, the coolant can be partially dispersed onto a radially inward portion of the stator end turns 26 which can lead to enhanced cooling of the stator assembly 24. In some embodiments, once the coolant enters the machine cavity 22, it can flow over various electric machine module 10 components and remove some of the heat energy generated during operation of the electric machine 14. The coolant can then pool near or at a bottom portion of the machine cavity 22. A drain (not shown) can be located at or near the bottom portion of the machine cavity 22 to direct the pooled coolant to a heat transfer element outside the housing 12 for recooling. The heat transfer element can be a radiator or another suitable heat exchanger.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising;
an electric machine including a rotor assembly, the rotor assembly including:
a first set of rotor laminations, the first set of rotor laminations including a portion having a first inner radius and at least one coolant opening,
the first set of rotor laminations are positioned relative to one another so that each of the at least one coolant openings substantially align to form separate coolant paths on each axial side of the rotor assembly,
wherein each coolant path extends from a substantially central location within the rotor assembly in a substantially axial direction along a portion of the axial length of the rotor assembly; and
wherein the coolant paths are configured and arranged to allow liquid to flow axially outward through the coolant paths to drain into a machine cavity;
a second set of rotor laminations, the second set of rotor laminations including a portion having a second inner radius larger than the first inner radius, and
a rotor hub including, a center support, the rotor hub coupled to a shaft and having a diameter larger than a diameter of the shaft;
at least one substantially circumferential flow channel disposed substantially around a circumference of the rotor hub,
the at least one substantially circumferential flow channel defined between the first set of rotor laminations, the second set of rotor laminations, and the rotor hub,
the at least one substantially circumferential flow channel defining at least a portion of the coolant paths.

2. The electric machine module of claim 1 wherein the first set of rotor laminations and the second set of rotor laminations are positioned relative to one another to form radially extending fins, and the at least one substantially circumferential flow channel is defined between the radially extending fins and the rotor hub.

3. The electric machine module of claim 1, wherein the rotor hub includes coolant apertures through the rotor huh and substantially adjacent to the center support on each axial side of the rotor assembly, the coolant apertures in fluid communication with the at least one substantially circumferential now channel and the coolant paths on each axial side of the rotor assembly.

4. The electric machine module of claim 3, and further comprising a stator assembly at least partially circumscribing the rotor assembly, the stator assembly including stator end turns.

5. The electric machine module of claim 4, and further comprising a housing substantially circumscribing the electric machine, the housing at least partially defining the machine cavity, the machine cavity in fluid communication with the at least one flow channel, the coolant paths, and the coolant apertures.

6. The electric machine module of claim 5, wherein a liquid coolant is capable of being dispersed through the coolant apertures, substantially through the at least one substantially circumferential flow channel and the coolant paths, and into the machine cavity and dispersing at least partially onto the stator end turns.

7. An electric machine module comprising:
an electric machine including a rotor assembly, the rotor assembly including a plurality of rotor laminations circumscribing a rotor hub including a center support, the plurality of rotor laminations including a plurality of fins extending radially inward toward the rotor hub;
the rotor hub being coupled to and having a diameter larger than a diameter of a rotor shaft;
a plurality of substantially circumferential flow channels defined between the fins; and
separate coolant paths fluidly connecting at least some of the plurality of substantially circumferential flow channels, the coolant paths extending from a substantially central location within the rotor assembly in a substantially axial direction along a portion of the axial length of the rotor assembly; and being configured and arranged to allow a liquid coolant to flow axially outward through the coolant paths and into a machine cavity.

8. The electric machine module of claim 7, wherein the plurality of rotor laminations includes a first set of rotor laminations comprising a first inner radius and a second set of rotor laminations comprising a second inner radius larger than the first inner radius.

9. The electric machine module of claim 8, wherein the first set of rotor laminations and the second set of rotor laminations are positioned relative to one another to form the fins.

10. The electric machine module of claim 8, wherein each of the first set of rotor laminations includes at least one coolant opening.

11. The electric machine module of claim 10, wherein the first set of rotor laminations and the second set of rotor laminations are positioned relative to one another so that each of the at least one coolant openings substantially align to form the coolant pathways.

12. The electric machine module of claim 11, wherein the rotor hub includes coolant apertures extending through the rotor hub and substantially adjacent to the center support on each axial side of the rotor assembly, the coolant apertures in fluid communication with the plurality of substantially circumferential flow channels and the coolant paths on each axial side of the rotor assembly.

13. The electric machine module of claim 12, and further comprising a stator assembly at least partially circumscribing the rotor assembly, the stator assembly including stator end turns.

14. The electric machine module of claim 13, and further comprising a housing substantially circumscribing the electric machine, the housing at least partially defining the machine cavity, the machine cavity in fluid communication with the plurality of substantially circumferential flow channels, the coolant pathways, and the plurality of coolant apertures.

15. The electric machine module of claim 14, wherein a coolant is capable of being dispersed through the plurality of coolant apertures, substantially through the plurality of substantially circumferential flow channels and the coolant pathways, and into the machine cavity and dispersing at least partially onto the stator end turns.

16. A method for cooling an electric machine module, the method comprising:
    providing an electric machine including a rotor assembly, the rotor assembly including a plurality of rotor laminations and a rotor hub, the plurality of rotor laminations including a plurality of different inner diameters, and the rotor hub including at least one coolant aperture and being coupled to a smaller diameter rotor shaft;
    positioning the plurality of rotor laminations relative to each other around the rotor hub to form at least one substantially circumferential flow channel disposed substantially around a circumference of the rotor hub, the at least one substantially circumferential flow channel in fluid communication with the at least one coolant aperture;
    providing a housing substantially circumscribing the electric machine, the housing at least partially defining a machine cavity, the machine cavity in fluid communication with the at least one substantially circumferential flow channel; and
    positioning the plurality of rotor laminations relative to each other around the rotor hub to form coolant paths extending from a substantially central location within the rotor assembly in a substantially axial direction along a portion of the axial length of the rotor assembly, the coolant paths in fluid communication with the at least one substantially circumferential flow channel, and circulating liquid coolant from the at least one coolant aperture, through the at least one substantially circumferential flow channel, axially outward through the coolant paths, and into the machine cavity at each axial end of the rotor assembly to cool the electric machine.

17. The method for cooling an electric machine module of claim 16, and further comprising providing a stator assembly at least partially circumscribing the rotor assembly, the stator assembly including stator end turns, wherein a portion of the coolant flowing into the machine cavity from the coolant paths contacts the stator end turns.

* * * * *